(12) United States Patent
Cooper

(10) Patent No.: US 7,648,756 B2
(45) Date of Patent: *Jan. 19, 2010

(54) COATING FOR ENHANCING LOW TEMPERATURE HEAT SEALABILITY AND HIGH HOT TACK TO POLYMERIC SUBSTRATES

(75) Inventor: Robin Cooper, Attgrt (BE)

(73) Assignee: Michelman, Inc., Cincinnati, OH (US)

( * ) Notice: Subject to any disclaimer, the term of this patent is extended or adjusted under 35 U.S.C. 154(b) by 476 days.

This patent is subject to a terminal disclaimer.

(21) Appl. No.: 11/546,672

(22) Filed: Oct. 12, 2006

(65) Prior Publication Data

US 2007/0087189 A1 Apr. 19, 2007

Related U.S. Application Data

(60) Provisional application No. 60/726,380, filed on Oct. 13, 2005, provisional application No. 60/819,006, filed on Jul. 6, 2006.

(51) Int. Cl.
 *B32B 27/32* (2006.01)
 *B32B 5/16* (2006.01)
 *B32B 27/00* (2006.01)
 *B32B 27/08* (2006.01)
 *B05D 3/02* (2006.01)

(52) U.S. Cl. ............... 428/220; 428/331; 428/421; 428/500; 428/515; 427/299; 427/307; 427/322; 427/372.2; 523/443

(58) Field of Classification Search ............... None
 See application file for complete search history.

(56) References Cited

U.S. PATENT DOCUMENTS

| | | | |
|---|---|---|---|
| 5,419,960 | A | 5/1995 | Touhsaent |
| 5,789,123 | A | 8/1998 | Cleckner et al. |
| 5,958,531 | A | 9/1999 | Stevenson |
| 5,969,025 | A | 10/1999 | Corzani |
| 6,447,899 | B1 | 9/2002 | Dutton et al. |
| 6,531,216 | B1 | 3/2003 | Williams et al. |
| 6,596,379 | B2 | 7/2003 | McGee |
| 6,706,389 | B1 | 3/2004 | Bates et al. |
| 6,852,792 | B1 | 2/2005 | Capendale et al. |
| 7,470,736 | B2 * | 12/2008 | Cooper ............... 524/270 |
| 2003/0047279 | A1 | 3/2003 | Ramalingam |
| 2003/0157354 | A1 | 8/2003 | Van Veghel et al. |
| 2004/0105994 | A1 | 6/2004 | Lu et al. |

FOREIGN PATENT DOCUMENTS

| | | |
|---|---|---|
| EP | 1 035 165 A1 | 9/2000 |
| JP | 2004160815 A | 6/2004 |

* cited by examiner

*Primary Examiner*—Sheeba Ahmed
(74) *Attorney, Agent, or Firm*—Dinsmore & Shohl LLP

(57) ABSTRACT

A coating is provided for enhancing low temperature heat sealability and providing high hot tack to polymeric substrates. The coating is water-based and includes a dispersion of a copolymer of ethylene and acrylic or methacrylic acid, and a compatible adhesion enhancer which is an aliphatic polyurethane emulsion. The coating may also include additives such as wetting agents, matting agents, antiblocking agents, and tackifying resins. The coating may be applied to a variety of polymeric substrates and may be heat sealed to itself, or to polymeric substrates, cellulosic substrates, and metal substrates.

24 Claims, 1 Drawing Sheet

COATING FOR ENHANCING LOW TEMPERATURE HEAT SEALABILITY AND HIGH HOT TACK TO POLYMERIC SUBSTRATES

CROSS REFERENCE TO RELATED APPLICATIONS

This application claims the benefit of U.S. Provisional Application No. 60/726,380 filed Oct. 13, 2005, and U.S. Provisional Application No. 60/819,006 filed Jul. 6, 2006, both entitled COATING FOR ENHANCING LOW TEMPERATURE HEAT SEALABILITY AND HIGH HOT TACK TO POLYMERIC SUBSTRATES. The entire contents of said applications are hereby incorporated by reference.

BACKGROUND OF THE INVENTION

This invention relates to a coating for use on polymeric substrates, and more particularly, to a coating which provides low temperature heat sealability and high hot tack to such polymeric substrates.

In the packaging industry, heat-sealable films are often employed which can be sealed to themselves. For example, polymeric films such as biaxially oriented polypropylene are often used in packaging candy bars and other foods by the application of heat and pressure, which seals the film to itself or to another substrate. However, as such films generally exhibit poor heat sealing characteristics, a coating is typically applied to the film which allows the film to be sealed over a relatively wide temperature range and which adheres securely to the film surface. Heat sealable coatings are known in the art which are comprised of copolymers of ethylene and acrylic acid, vinyl acetate, or vinyl alcohol. See, for example, U.S. Pat. Nos. 5,419,960 and 6,447,899.

However, heat seal coatings which are currently in use typically require sealing temperatures of at least about 90° C. Further, such coatings often do not provide satisfactory hot tack properties to the film, i.e., the strength of the heat seal provided when the coating is heated to a temperature at or above the melting point of the polymer coating.

In addition, many of the coatings currently do not adhere well to the packaging film surface and require the use of a primer to aid in enhancing adhesion of the heat sealable coating to the film surface.

Accordingly, there is still a need in the art for a coating for use on polymeric substrates which provides low temperature heat sealability as well as high hot tack, and which adheres well to the substrate surface without the need for the application of additional precoatings and primers.

SUMMARY OF THE INVENTION

Embodiments of the present invention meet those needs by providing a coating for use on a wide variety of polymeric substrates such as polypropylene, biaxially oriented polypropylene (BOPP), polyethylene terephthalate, polyamide, biaxially oriented polyamide, and polyvinyl chloride. The coating provides heat sealing properties to printed and unprinted polymeric substrates, allowing the substrates to be heat sealed at low temperatures with high hot tack. In addition, the coating adheres to the polymeric substrates without the need for any additional precoatings.

According to one aspect of the present invention, a coating for providing heat sealability to a polymeric substrate is provided. The coating comprises a mixture of a dispersion of a copolymer of ethylene and acrylic or methacrylic acid and a compatible adhesion enhancer comprising an aliphatic polyurethane emulsion. By "adhesion enhancer," it is meant that the component enhances adhesion of the coating to the substrate to which it is applied. By "heat sealability," it is meant that the polymeric substrate may be sealed to itself or to another substrate by the application of heat and pressure. The coating provides heat sealability at temperatures ranging from about 75° C. to about 140° C. The polymeric substrate, once coated, may be sealed to a variety of substrates including polymeric substrates such as polyethylene terepthalate, polyethylene, amorphous polyethylene polypropylene, polystyrene, polycarbonate, Tyvek® and nylon; cellulosic substrates such as paper; or metal substrates such as aluminum foil.

The coating may further include a wetting agent which is preferably selected from the group consisting of alcohols and surfactants. The coating also preferably includes a matting agent. The matting agent may comprise, for example, amorphous silica.

The coating optionally includes an antiblocking agent selected from the group consisting of crosslinking agents, waxes, silica, metal hydroxides, and mixtures thereof. Where the antiblocking agent comprises a metal hydroxide, the coating preferably includes from about 0.05 to about 1.0% by weight of the metal hydroxide. Where the antiblocking agent is a crosslinking agent, the coating preferably includes from about 0.05 to 5% by weight of the crosslinking agent. A preferred crosslinking agent is a melamine formaldehyde resin.

Where the antiblocking agent comprises a wax, the coating preferably includes from about 4 to 15% by weight of the wax.

The coating may further optionally contain one or more tackifying resins to aid in enhancing the heat sealing properties of the coating. The coating preferably comprises from about 5 to about 45% by weight tackifying resin(s).

Preferably, the coating comprises from about 60 to 95% by weight of the copolymer dispersion. Typically, the dispersion contains 35% total solids. The coating preferably comprises from about 5 to 40% of the aliphatic polyurethane dispersion, which contains 33% total solids.

The coating is preferably applied to a polymeric substrate by applying the coating to at least one major surface of the substrate and then preferably drying the coating. Preferably, the polymeric substrate is selected from polypropylene, biaxially oriented polypropylene, cast polypropylene, polyethylene terephthalate, polyamide, biaxially oriented polyamide, and polyvinyl chloride.

In one embodiment, the method of applying the coating includes treating at least one major surface of the substrate by a flame treatment or corona discharge treatment prior to applying the coating.

Typically, the coating is applied to the polymeric substrate such that, when dried, it forms a coating having a thickness of from about 0.1 to about 2 microns, and more preferably, from about 0.3 to about 0.5 microns. The dried coating is printable with a variety of indicia including text and graphics. For example, the coated substrate may be printed, for example, by applying liquid toner from a digital printing apparatus to the coated surface of the polymeric substrate. After the coated substrate is printed, it may then be heat sealed to itself or to another substrate at a temperature ranging from about 75° C. to about 140° C.

Accordingly, it is a feature of the present invention to provide a coating and a method of applying the coating to polymeric substrates which provides low temperature heat sealability and high hot tack properties to the polymeric sub-

DETAILED DESCRIPTION OF THE PREFERRED EMBODIMENT

Figure 1A:
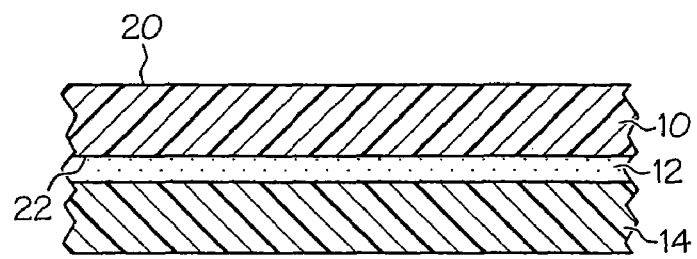
FIG. 1A is a sectional view illustrating two substrates heat sealed to one another where one of the substrates includes a heat seal coating on a surface thereof.

The coating compositions described herein provide a number of advantages over prior coatings in that the coatings soften at lower temperatures than prior heat seal compositions, providing good heat seal properties with the application of less heat. Once the coatings are heated and softened, they provide high hot tack, i.e., they are very tacky and adherent and provide a strong heat seal. The coatings may be applied to a number of different polymeric substrates, and do not require the use of any additional primers or precoatings to provide heat sealability or adhesion to the polymeric substrates. In addition, the coatings avoid the problems of solvent-based coatings because they use no volatile solvents.

In a preferred embodiment, the coating is based on a dispersion of a copolymer of ethylene and acrylic acid or methacrylic acid, which provides low temperature heat sealing properties. The copolymer should have a sufficient degree of hot tack to ensure low temperature heat sealability. Preferably, the copolymer comprises from about 65 to 95 wt % ethylene and from about 5 to 35 wt % acrylic or methacrylic acid. The copolymer may have a number average molecular weight of about 2,000 to 50,000. The copolymer is preferably prepared as a dispersion by heating the solid polymer with a water phase in a pressure reactor in the presence of a base such as ammonia or an alkali such that the base reacts with the acid groups on the polymer, and upon melting, the polymer forms a colloidal dispersion. The coating contains from about 60 to 95 wt % of the dispersion containing 35% total solids. Suitable ethylene acrylic acid dispersions for use in the present invention are commercially available from Michelman, Inc. under the designation Michem®Prime 4990R.E and Michem®Prime 4983R.E.

While ethylene-acrylic or methacrylic acid copolymers exhibit good hot tack and low temperature heat sealability, they generally do not have sufficient adhesion to nonpolar polymeric substrates such as polypropylene or polyethylene terephthalate to provide high bond strength. Accordingly, the coating further includes a component which is compatible with the ethylene-acrylic or methacrylic acid copolymer dispersion and which increases adhesion to the underlying substrate without adversely affecting the hot tack or heat seal properties of the copolymers. The adhesion enhancer is preferably in the form of an aqueous dispersion comprising a polyurethane. Where the coating includes a polyurethane dispersion, the coating preferably includes from about 5 to 40 wt % of the dispersion which contains 33% total solids. A suitable polyurethane dispersion is commercially available from NeoResins under the designation NeoRez® R-600. Other suitable polyurethane dispersions include Incorez 217 from Industrial Copolymer Ltd. and TD7037 or TD7038 from Scott Bader Company Ltd.

The coating composition optionally further contains a wetting agent for reducing the surface tension of the coating to wet out the substrate and to promote flow or leveling of the coating prior to drying. Suitable wetting agents include surfactants and alcohols, such as isopropyl alcohol. Preferred surfactants include nonionic acetylinic glycol-based surfactants such as Dynol™ 604 from Air Products. Other suitable surfactants include polyalkylene oxide modified polymethylsiloxanes such as Silwet® L-77 from GE Advanced Materials.

Other optional additives which may be included in the coating are matting agents such as amorphous silica, which maintains a matte print surface. Such additives may be present in an amount of from about 2 to 4 wt %. A preferred amorphous silica is Ace-Matt TS100, available from Degussa.

Because the coating exhibits a high hot tack, it is desirable to add one or more antiblocking agents to the coating to reduce residual tack when the substrate is rewound after coating and during storage. The antiblocking agents should not interfere with hot tack development. Preferred antiblocking agents include crosslinking agents, waxes, silica, metal hydroxides, and mixtures thereof. A preferred crosslinking agent is melamine formaldehyde resin, which may be present in an amount of from about 0.05 to 5 wt % of the coating. Other suitable crosslinking agents include zinc oxide and polyethylene imine (Aziridine).

Suitable waxes include carnauba wax, oxidized polyethylene wax, and montan wax. Preferred for use is a 25% solids carnauba wax emulsion available from Michelman, Inc. under the designation Michem® Lube 160. The wax is preferably included in an amount of from about 4 to 15% by weight of the coating.

Where metal hydroxides are added to the formulation as antiblocking agents, they are incorporated as metal ions to form a partial ionomerization of the ethylene-acrylic or methacrylic copolymer. The metal ions may be selected from Group IA, IIA, or IIB of the periodic table. Preferred for use are sodium or potassium ions in the form of their hydroxides. The hydroxides are included in amount of from about 0.05 to 1% by weight of the coating. When such metal hydroxides are used, the coating is preferably made by forming two ethylene acrylic acid dispersions; e.g., an ammonia dispersion based on an ethylene acrylic acid such as MichemPrime 4990R.E. and a sodium dispersion based on the same ethylene acrylic acid.

The coating may further optionally contain one or more tackifying resins to aid in enhancing the heat sealing properties of the coating. Preferred tackifying resins include dimerized or partially dimerized rosins such as wood rosins, and modified wood rosins. Preferred tackifying resins for use in the coating include Foral® AX, Poly-Pale® and Staybelite® 570, commercially available from Eastman, and Hercules® Rosin 731 D, available from Hercules Incorporated. The coating preferably comprises from about 5 to about 40% by weight tackifying resin(s). The tackifying resins are preferably incorporated in the coating as a dispersion of acidic ethylene interpolymers as described in U.S. Pat. No. 4,714,728.

The two dispersions are preferably blended in a ratio of 40 to 100 parts of the ammonia-based dispersion and 0 to 60 parts of the sodium based dispersion along with the remaining components.

Water (preferably soft water) may also be added to the coating to lower the viscosity of the coating and aid in the flow of the coating. The coating may contain from 0 to 30 wt % of soft water.

Before the coating is applied to a polymeric substrate, the surface of the substrate is preferably treated to ensure that the coating will wet out the surface of the film. The film is preferably treated using conventional techniques such as a flame treatment or a high voltage corona discharge treatment.

The coating is applied to the polymeric substrate in any suitable manner including gravure coating, roll coating, wire rod coating, flexographic printing, spray coating and the like. The coating composition is preferably applied such that upon drying, the coating forms a smooth, evenly distributed layer of about 0.1 to 2 microns in thickness, and more preferably, from about 0.3 to 0.5 microns in thickness, which imparts the desired heat sealing properties to the substrate. After the coating is applied, it may be dried by hot air, radiant heat, or any other suitable means which provides an adherent coated film.

The resulting film may be used for packaging food and other goods by applying heat and pressure to seal the film to itself or to another substrate. Suitable substrates to which the coated film may be adhered include polymeric substrates, cellulosic substrates, and metal substrates. For example, a coated polyethylene therephthalate film may be adhered to a polypropylene or paper substrate. In addition, a coated paper or polypropylene film may be adhered to a rigid polypropylene or polystyrene container.

Referring now to FIG. 1A, a first substrate 10 having first and second major surfaces 20 and 22 includes the coating 12 on second surface 20. As shown, the second surface of the first substrate 10 is heat sealed to the surface of a second substrate 14. In the embodiment shown, the first and second substrates are both comprised of a polymeric material.

Figure 1B:
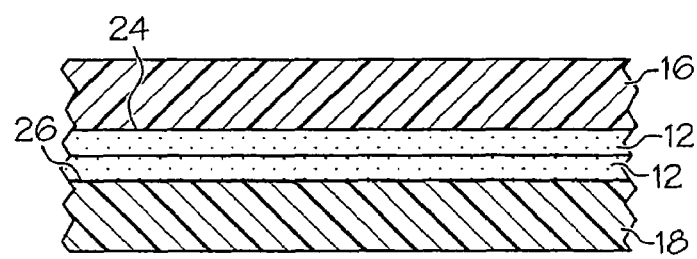
FIG. 1B is a sectional view illustrating two substrates heat sealed to one another with the sealed surfaces of the substrates including the heat seal coatings thereon.

FIG. 1B illustrates another embodiment of the invention in which a first substrate 16 comprising a polymeric is adhered to a second substrate 18 which is different from the first substrate, i.e., it may comprise a metal substrate or cellulosic substrate. In the embodiment shown, the surfaces 24 and 26 of each substrate includes a heat sealable coating.

Figure 2:
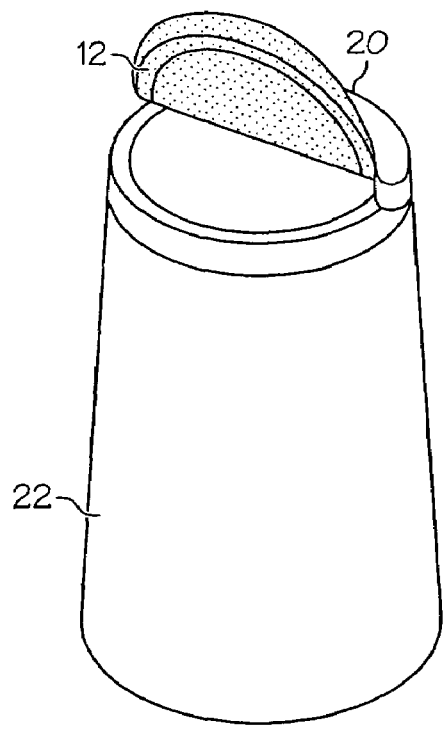
FIG. 2 is a perspective view of a container including a lid substrate which includes the heat seal coating.

While the coating has been described herein for application to polymeric substrates used in packaging, it should be appreciated that the coating may also be applied to substrates which are used as lids for containers. Such lid substrates may comprise, for example, plastic films, paper, and aluminum foil. Once the coating is applied to the substrate/lid, the substrate may be heat sealed to a container. For example, a coated aluminum foil lid substrate may be adhered to a container such as a butter or yogurt container which is comprised of rigid polypropylene, polyethylene, or polystyrene. FIG. 2 illustrates this embodiment of the invention in which the coating 12 is applied to substantially the entire surface of a metallic lid substrate 20 and heat sealed around its perimeter over an opening in container 22. When the container is ready to be opened, a user may peel the lid back from the container for use as shown.

While certain representative embodiments and details have been shown for purposes of illustrating the invention, it will be apparent to those persons skilled in the art that various changes in the methods and apparatus disclosed herein may be made without departing from the scope of the invention.

What is claimed is:

1. A coating for providing heat sealability to polymeric substrates comprising a mixture of:
   a) a first aqueous dispersion of a copolymer of ethylene and acrylic or methacrylic acid and ammonia;
   b) a second aqueous dispersion of a copolymer of ethylene and acrylic or methacrylic acid and a metal hydroxide; and
   c) a compatible adhesion enhancer comprising an aliphatic polyurethane emulsion; said coating, when applied to a polymeric substrate, providing heat sealability at a temperature of between about 75° C. to 140° C.

2. The coating of claim 1 further including a wetting agent.

3. The coating of claim 2 wherein said wetting agent is selected from the group consisting of alcohols and surfactants.

4. The coating of claim 1 further including a matting agent.

5. The coating of claim 4 wherein said matting agent comprises amorphous silica.

6. The coating of claim 1 further including an antiblocking agent selected from the group consisting of crosslinking agents, waxes, silica, and mixtures thereof.

7. The coating of claim 1 wherein said second aqueous dispersion comprises from about 0.05 to about 1.0% by weight of said metal hydroxide.

8. The coating of claim 6 comprising from about 0.5 to 5% by weight of a crosslinking agent.

9. The coating of claim 6 comprising from about 4 to 15% by weight of a wax.

10. The coating of claim 1 comprising at least one tackifying resin.

11. The coating of claim 10 comprising from about 5 to about 40% by weight of said at least one tackifying resin.

12. The coating of claim 1 comprising from about 60 to 95% by weight of said first and second aqueous dispersions, each containing 35% total solids.

13. The coating of claim 1 comprising from about 5 to 40% of said aliphatic polyurethane dispersion containing 33% total solids.

14. A heat sealed product comprising a first polymeric substrate having first and second major surfaces, a second polymeric substrate having first and second major surfaces, with at least one of said major surfaces of each of said first and second polymeric substrates having coated thereon a coating for providing heat sealability thereto, said coating comprising a dried mixture of a first aqueous dispersion of a copolymer of ethylene and acrylic or methacrylic acid and ammonia, a second aqueous dispersion of a copolymer of ethylene and acrylic or methacrylic acid and a metal hydroxide, and an adhesion enhancer comprising an aliphatic polyurethane emulsion, said coated surfaces of said first and second polymeric substrates being heat sealed together.

15. The heat sealed product of claim 14 wherein said first or second polymeric substrate is selected from polypropylene, biaxially oriented polypropylene, cast polypropylene, polyethylene terephthalate, polyamide, biaxially oriented polyamide and polyvinyl chloride, and wherein said first polymeric substrate may be the same as or different from said second polymeric substrate.

16. The heat sealed product of claim 14 wherein said at least one major surface of said first or second polymeric substrates has been treated by a flame treatment or corona discharge treatment prior to applying said coating thereto.

17. The heat sealed product of claim 14 wherein said coating is about 0.1 to about 2 microns thick.

18. The heat sealed product of claim 14 wherein said coating is from about 0.3 to about 0.5 microns thick.

19. The heat sealed product of claim 14 wherein said coated first or second polymeric substrate contains printed indicia.

20. A method of applying a coating to a polymeric substrate for providing heat sealability of said substrate comprising:
   1) providing a polymeric substrate having first and second major surfaces; and
   2) applying a coating to at least one of said major surfaces of said substrate; said coating comprising a mixture of a first aqueous dispersion of a copolymer of ethylene and acrylic or methacrylic acid and ammonia, a second aqueous dispersion of a copolymer of ethylene and acrylic or methacrylic acid and a metal hydroxide, and an adhesion enhancer comprising an aliphatic polyurethane emulsion.

21. The method of claim 20 including treating said at least one major surface of said substrate by a flame treatment or corona discharge treatment prior to applying said coating.

22. The method of claim 20 including drying said coating after applying said coating to said at least one major surface of said substrate.

23. A heat sealed product comprising a container having a lid heat sealed over an opening in said container, said lid comprising a metal or polymeric substrate and including a coating over the surface of said lid in contact with said container, said coating comprising a dried mixture of a first aqueous dispersion of a copolymer of ethylene and acrylic or methacrylic acid and ammonia, a second aqueous dispersion of a copolymer of ethylene and acrylic or methacrylic acid and a metal hydroxide, and an adhesion enhancer comprising an aliphatic polyurethane emulsion.

24. A heat sealed product comprising a polymeric substrate heat sealed to itself, wherein said polymeric substrate comprises first and second major surfaces, with at least one of said major surfaces having coated thereon a coating for providing heat sealability thereto, said coating comprising a dried mixture of a first aqueous dispersion of a copolymer of ethylene and acrylic or methacrylic acid and ammonia, a second aqueous dispersion of a copolymer of ethylene and acrylic or methacrylic acid and a metal hydroxide, and an adhesion enhancer comprising an aliphatic polyurethane emulsion.

* * * * *

UNITED STATES PATENT AND TRADEMARK OFFICE
CERTIFICATE OF CORRECTION

PATENT NO.        : 7,648,756 B2                                              Page 1 of 1
APPLICATION NO. : 11/546672
DATED             : January 19, 2010
INVENTOR(S)       : Robin Cooper It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 575 days.

Signed and Sealed this

Twenty-third Day of November, 2010

David J. Kappos
*Director of the United States Patent and Trademark Office*